United States Patent
Goldstein

(10) Patent No.: US 10,630,134 B2
(45) Date of Patent: Apr. 21, 2020

(54) ELECTRIC MACHINE COOLING PASSAGE WITH INTERNAL FIN STRUCTURE

(71) Applicant: Ford Global Technologies, LLC, Dearborn, MI (US)

(72) Inventor: Cyrille Goldstein, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/899,518

(22) Filed: Feb. 20, 2018

(65) Prior Publication Data
US 2019/0260259 A1    Aug. 22, 2019

(51) Int. Cl.
| H02K 5/18 | (2006.01) |
| H02K 5/20 | (2006.01) |
| H02K 9/00 | (2006.01) |
| H02K 1/32 | (2006.01) |

(52) U.S. Cl.
CPC .............. *H02K 5/18* (2013.01); *H02K 1/32* (2013.01); *H02K 5/20* (2013.01); *H02K 9/005* (2013.01)

(58) Field of Classification Search
CPC .. H02K 1/20; H02K 1/22; H02K 1/27; H02K 1/2706; H02K 1/274; H02K 1/276; H02K 1/2766; H02K 1/277; H02K 1/32; H02K 9/00; H02K 9/02; H02K 9/06; H02K 9/10; H02K 9/18; H02K 9/19; H02K 9/197; H02K 9/20; H02K 9/22; H02K 9/24; H02K 7/00; H02K 7/003; H02K 7/086; H02K 7/088; H02K 7/18; H02K 7/1823

See application file for complete search history.

(56) References Cited

U.S. PATENT DOCUMENTS

| 5,189,325 A * | 2/1993 | Jarczynski | H02K 9/19 310/54 |
| 6,317,963 B1 * | 11/2001 | Powers | H02K 5/1732 29/596 |
| 8,901,791 B2 | 12/2014 | Saban et al. | |
| 8,970,074 B2 | 3/2015 | Wagner et al. | |
| 9,559,569 B2 | 1/2017 | Huang et al. | |
| 2005/0140235 A1 * | 6/2005 | Yamagishi | H02K 1/276 310/156.53 |
| 2013/0038151 A1 * | 2/2013 | Ohashi | H02K 1/32 310/59 |
| 2014/0333163 A1 * | 11/2014 | Horii | H02K 1/20 310/59 |
| 2015/0318764 A1 * | 11/2015 | Baba | H02K 9/19 310/54 |

(Continued)

FOREIGN PATENT DOCUMENTS

FR    2974954 B1    11/2012

*Primary Examiner* — Tran N Nguyen
(74) *Attorney, Agent, or Firm* — David Kelley; Brooks Kushman, P.C.

(57) ABSTRACT

An electric machine is provided. The electric machine may include a shaft and a rotor. The shaft may define a rotational axis and a coolant passage that is transverse to the axis. The rotor may be assembled to the shaft and define an outer periphery, an inner periphery, and a medial section extending therebetween. The medial section may define a coolant channel that defines an inner edge and a plurality of elongated fins extending therefrom. The plurality of elongated fins may be configured to transfer heat from the outer periphery to coolant flowing from the coolant passage through the coolant aperture.

15 Claims, 4 Drawing Sheets

(56) References Cited

U.S. PATENT DOCUMENTS

2016/0036276 A1* 2/2016 Yamagishi ............... H02K 1/32
                                                                               310/59
2016/0149450 A1* 5/2016 Horii ........................ H02K 1/32
                                                                               310/54

\* cited by examiner

ELECTRIC MACHINE COOLING PASSAGE WITH INTERNAL FIN STRUCTURE

TECHNICAL FIELD

The present disclosure relates to electric machines for use with electric and hybrid-electric vehicles capable of acting either as a motor or as a generator.

BACKGROUND

Vehicles such as battery-electric vehicles and hybrid-electric vehicles contain a traction-battery assembly to act as an energy source. For example, the traction-battery assembly is electrically connected to an electric machine that provides torque to driven wheels. The traction-battery assembly may include components and systems to assist in managing vehicle performance and operations. It may also include high-voltage components and an air or liquid thermal management system to control the temperature of the components.

Electric machines typically include a stator and a rotor that cooperate to convert electrical energy into mechanical motion or vice versa. The electric machines may include thermal management systems to cool the stator, rotor, or both.

SUMMARY

According to one embodiment of this disclosure, an electric machine is provided. The electric machine may include a shaft and a rotor. The shaft may define a rotational axis and a coolant passage that is transverse to the axis. The rotor may be assembled to the shaft and define an outer periphery, an inner periphery, and a medial section extending therebetween. The medial section may define a coolant channel that defines an inner edge and a plurality of elongated fins extending therefrom. The plurality of elongated fins may be configured to transfer heat from the outer periphery to coolant flowing from the coolant passage through the coolant aperture.

According to another embodiment of this disclosure, an electric machine is provided. The electric machine may include a rotor comprising a plurality of laminations each defining an outer periphery, an inner periphery, and a medial section extending therebetween that may define a coolant aperture having an inner edge and a plurality of elongated fins extending therefrom configured to transfer heat from the outer periphery to coolant flowing through the coolant aperture.

According to yet another embodiment of this disclosure, an electric machine is provided. The electric machine may include a rotor comprising a plurality of laminations each of the laminations defining an outer periphery, that defines a plurality of magnet cavities, an inner periphery, adapted to engage a rotating shaft, and a medial area extending therebetween that defines a coolant aperture having an inner edge and a plurality of elongated fins extending therefrom configured to transfer heat from the outer periphery to coolant flowing through the coolant aperture.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Hybrid-electric vehicles and electric vehicles rely, at least in part, on electric machines for power. As with an internal combustion engine, electric machines have efficiency losses that detract from their output. The losses may be in the rotor and the stator and manifest themselves as heat. The power of the electric machine may be limited to prevent it from overheating. Coolant may be provided through a coolant channel that may be defined by a rotor of the electric machine. The outer periphery or portion of the rotor is often hotter than the inner periphery or middle portion. Because heat transfer is a function of the size of the area, increasing the surface area of the rotor may improve heat transfer across the rotor and generally improve the efficiency of the electric machine. Increasing the surface area to increase efficiency is constrained by additional weight associated with increased surface area. The use of elongated fins extending from an inner edge of the coolant aperture may increase the heat transfer across the rotor while adding a limited amount of weight.

Figure 1:
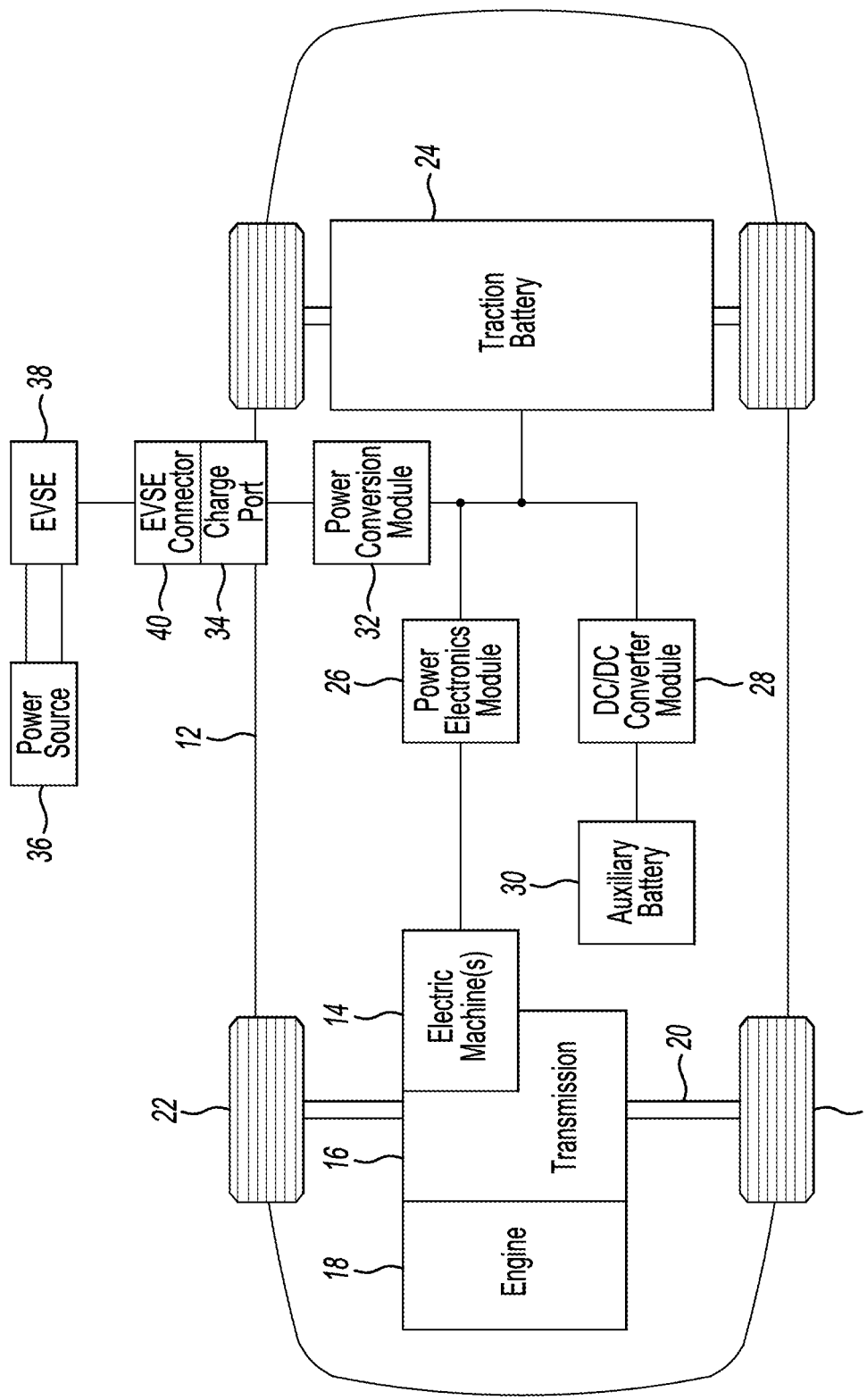
FIG. 1 is a schematic diagram of a typical plug-in hybrid-electric vehicle (HEV).

FIG. 1 depicts a typical plug-in hybrid-electric vehicle (HEV) 12. A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 may also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in an electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14.

For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components discussed may have one or more associated controllers to control and monitor the operation of the components. The controllers may communicate via a serial bus (e.g., Controller Area Network (CAN)) or via discrete conductors.

Figure 2:
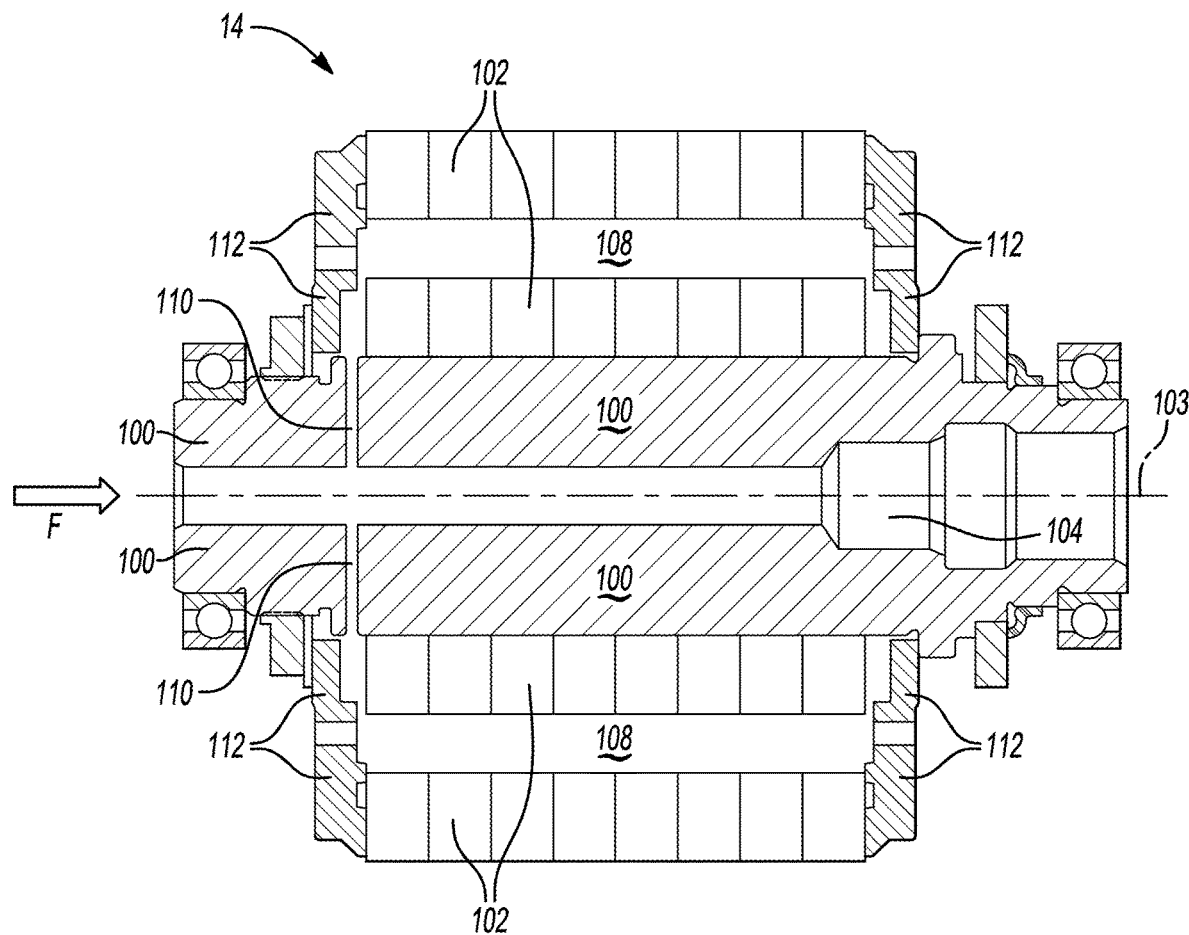
FIG. 2 is a cross-sectional view of an example electric machine.
Figure 3:
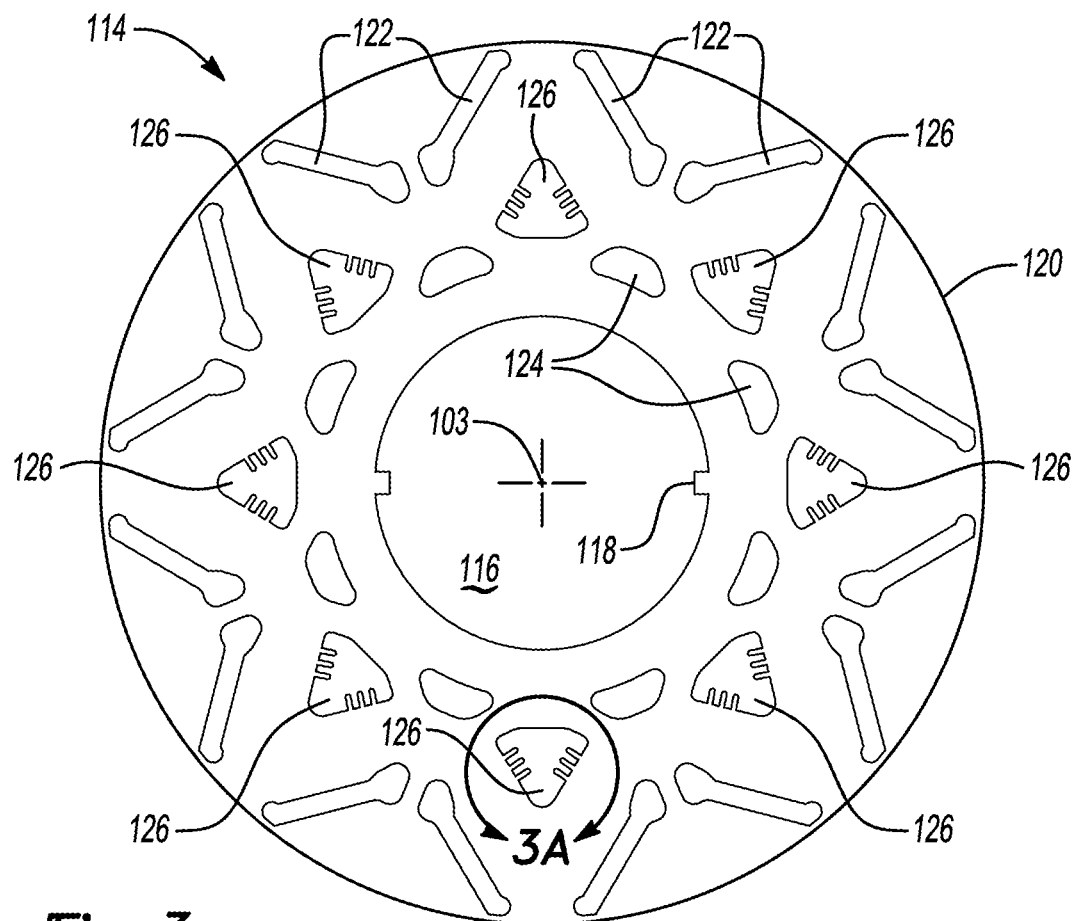
FIG. 3 is a top view of an example rotor lamination, according to a first embodiment.

Referring to FIG. 2, a cross sectional view of the electric machine 14 that includes a shaft 100 and a rotor assembly 102 is provided. The rotor assembly 102 is attached to a portion of the shaft 100 so that as the shaft rotates about a rotational axis 103, the rotor assembly 102 rotates. The rotor assembly may be surrounded by a stator (not illustrated) that generates an electromagnetic field that acts on magnets of the rotor assembly 102. As will be described in greater detail below, the rotor assembly or rotor 102 is comprised of a plurality of laminations 114 that each include one or more coolant apertures 124 (FIG. 3). When the plurality of laminations 114 are assembled to the shaft, the coolant apertures 124 of each lamination 114 define the rotor coolant channel 108. The plurality of laminations may be sandwiched by a pair of end plates 112 that are disposed on the shaft 100.

The shaft 100 may define one or more channels or passageways 108 that receive coolant from a source, e.g., pump, inlet tube, or reservoir (not illustrated) and provides the coolant to the rotor 102. For example, the shaft 100 may include a central coolant channel 104, that extends along the rotational axis 103, and transverse or vertical coolant channels 110, that extend between the central coolant channel 104 to the rotor coolant channels 108. The coolant may be provided to the central coolant channel 104 in the direction indicated by the directional arrow "F." As the shaft 100 rotates, the coolant is expelled from the central coolant channel 104 through the transverse channels 110 to the rotor 102 and the rotor coolant channels 108. After the coolant enters the rotor coolant channel 108, the coolant may travel along the length of the rotor 102 (e.g., parallel to the axis 103).

Referring to FIG. 3, a top view of a lamination 114 that includes a mounting aperture 116 surrounded by a keyway or inner periphery 118. The lamination 114 includes an outer periphery or outer edge 120 that defines the outer circumference of the lamination 114. In general, rotor laminations may have pockets or cavities arranged around the periphery of the rotor to house permanent magnets. The permanent magnets may be situated to interact with the magnetic field generated by the stator windings. Here, a portion of the lamination 114 defines several magnet cavities 122 that are capable of receiving magnets (not illustrated). Note the shape, size, quantity, and angular position of the cavities 122 are not limited to the illustration shown.

The lamination 114 may also include one or more weight-reduction apertures or holes 124. The weight-reduction apertures 124 are positioned closer to the mounting aperture 116, as illustrated, or in another suitable location. In the embodiment shown, the weight-reduction apertures 124 have a trapezoidal shape. Alternatively, the weight-reduction apertures 124 may have another shape, e.g., circular, rectangular, triangular, etc. While only two weight-reduction apertures 124 are labeled with element numeral 124, the other trapezoidal apertures disposed radially around the mounting aperture 116 are weight-reduction apertures. The element numerals are not illustrated for the sake of clarity. One or more coolant apertures 126 are positioned between the inner periphery 118 and the outer periphery 120. As will be described in greater detail below, the coolant apertures 126 may have various shapes. Additionally, the coolant apertures 126 include one or more fins that extend from an inner edge of the coolant aperture 126.

Figure 3A:
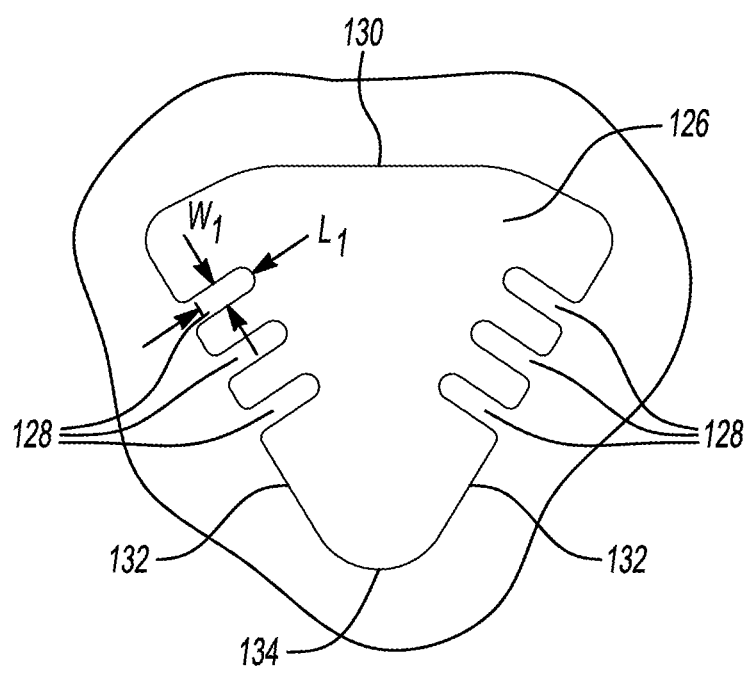
FIG. 3A-3C are partial top views of laminations according to additional embodiments.
Figure 3B:
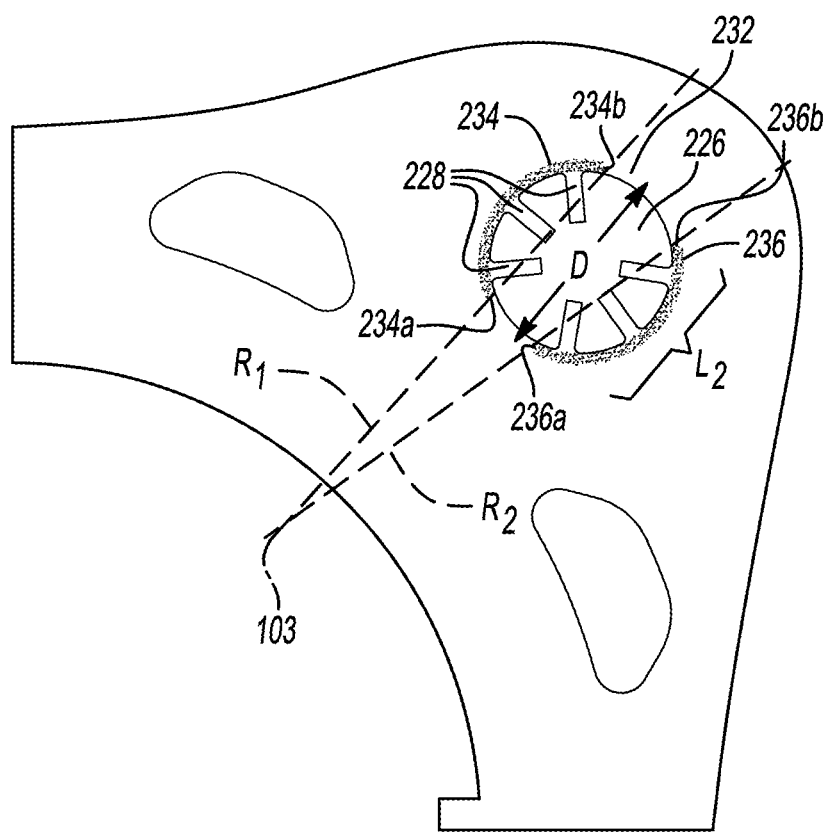
Figure 3C:
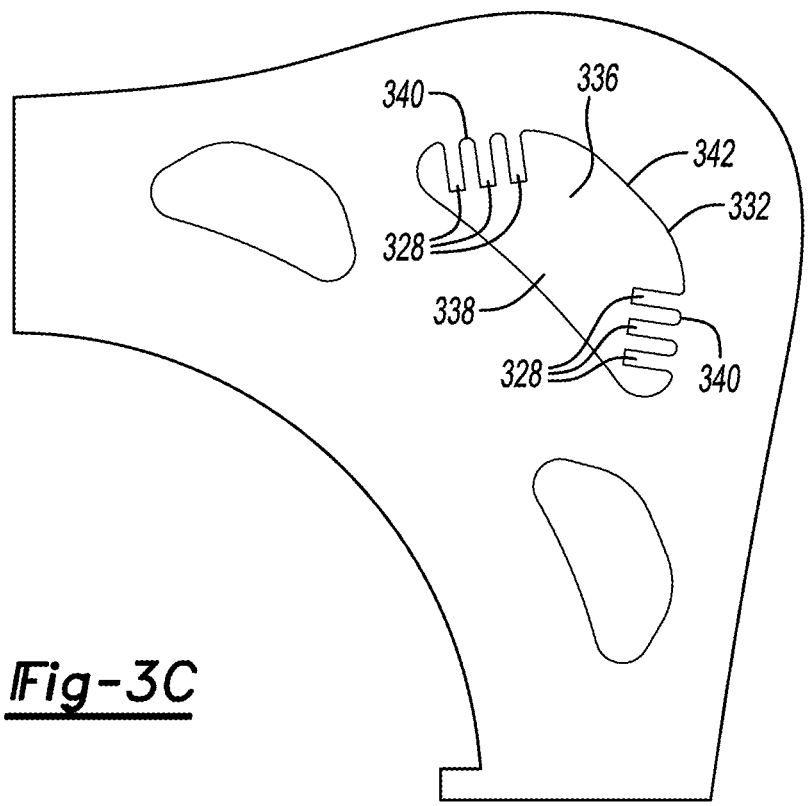

Referring to FIGS. 3A-3C, detailed views of the coolant apertures 126 according to various embodiments of this disclosure are illustrated. FIG. 3A shows the triangular shaped coolant aperture 126 according to the first embodiment of this disclosure. The triangular shaped coolant aperture 126 includes a base 130 and a pair of sides 132 that extend from the base 130 to a vertex 134. The base 130 is positioned closest to the mounting aperture 116 and the vertex is oriented towards the outer periphery 120. The hose 130 may be comprised of a single straight line segment or the base may include one or more segments that are angled relative to one another, as pictured. The coolant aperture 124 is aligned with between the two pairs of the magnet cavities 122.

Fins 128 extend from each of the sides 132 in a direction that is normal or orthogonal to the sides 132. The fins 128 are connected from the edge of the sides by two radii. The fins 128 provide additional cross-sectional area to the surface of the lamination 114. The additional cross-sectional area of the fins 128 is disposed within the coolant apertures 126 so that coolant or fluid flows across the fins 128. The fins 128 facilitate heat transfer from the outer periphery to the coolant apertures 126. The fins have a length $L_1$ that is measured from the end of the radii to the distal end disposed within the aperture 124. Each of the fins 128 define a width $W_1$ that is measured in a direction that is orthogonal to the length $L_1$. The distance of the length $L_1$ may be at least twice as large as the width $W_1$.

Referring specifically to FIG. 3B, a coolant aperture 226 according to a second embodiment is illustrated. The coolant aperture 226 has a circular shape having a diameter D that is defined by an inner periphery or inner edge 232. As in the first embodiment, the coolant aperture includes fins 228 that extend from the inner edge 232. The fins 228 extend from the inner edge 232 towards the center of the circular coolant aperture 226. A first shaded portion 234 and a second shaded portion 236 that is spaced apart from the first shaded portion 234 are marked on the inner edge 232. These shaded portions define permissible areas for the fins 228 to extend from. The first portion 234 and the second portion 236 are each comprised of segments of the inner edge 232 that extend between intersection points 234a and 234b (for the first portion 234) 236a and 236b (for the second portion) between the inner edge 232 and the dashed radial lines $R_1$ and $R_2$ that extend from the axis 103. The first and second portions 234 and 236 each define a straight-line distance $L_2$ between the intersection points. The straight-line distance $L_2$ may be provided by the following equation:

$$L_2 = \frac{D}{\sqrt{2}}$$

Where D is the diameter D of the circular shaped coolant aperture 226.

The location of the first portion 234 and the second portion 236 are predefined or predetermined so that the position of the fins 228 are in a relatively low-stress area of the lamination 114.

Referring specifically to FIG. 3C, a coolant aperture 336 according to a third embodiment is illustrated. The coolant aperture 336 has a trapezoidal shape that is defined by an inner edge or periphery 332. The inner edge 332 includes a pair of bases 338, 342 that are connected to one another by a pair of sides 340. As in the first and second embodiments, the trapezoidal coolant aperture 336 includes fins 328 that extend from each of the sides. The fins 328 may extend in a direction that is normal to the sides 340 of the coolant aperture 336.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
    a shaft defining a rotational axis and a coolant passage extending transversely to the axis; and
    a rotor, comprised of a plurality of stamped laminations, assembled to the shaft including an outer periphery, an inner periphery, and a medial section extending therebetween that defines a coolant channel having an inner edge and a plurality of elongated fins extending therefrom configured to transfer heat from the outer periphery to coolant flowing from the coolant passage through the coolant channel,
    wherein the coolant channel is circular shaped and the inner edge defines a first portion and a second portion that is spaced away from the first portion, and the plurality of elongated fins extend from the first and second portions of the inner edge.

2. The electric machine of claim 1 wherein the coolant channel has a triangular shape that includes a base and a vertex that includes a pair of sides extending from the base.

3. The electric machine of claim 2 wherein the each of the plurality of elongated fins extend from the inner edge of each of the sides.

4. The electric machine of claim 3 wherein each of the plurality of elongated fins extend from each of the sides in a direction that is normal to the inner edge of each of the sides.

5. The electric machine of claim 1 wherein each of the plurality of elongated fins define a width and a length that is at least two times greater than the width.

6. The electric machine of claim 1 wherein a circumferential length of the first portion and the second portion is proportional to a quotient of a diameter of the circular shaped coolant channel and a root of two.

7. An electric machine comprising:
    a rotor comprising a plurality of stamped laminations each defining an outer periphery, an inner periphery, and a medial section extending therebetween that defines a coolant aperture having an inner edge and a plurality of elongated fins extending therefrom configured to transfer heat from the outer periphery to coolant flowing through the coolant aperture,
    wherein the coolant aperture has a trapezoidal shape that includes a pair of bases that are connected by a pair of sides and the plurality of elongated fins extend from each of the sides.

8. The electric machine of claim 7 further comprising:
    first and second pairs of magnets each arranged to form a V-shape disposed within the outer periphery, wherein the coolant aperture is positioned between the inner periphery and the outer periphery and between the first and second pairs of magnets.

9. The electric machine of claim 7 wherein the each of the plurality of elongated fins extend from an inner edge of one of the sides in a direction normal to each of the sides.

10. The electric machine of claim 7 further comprising:
    a shaft disposed within the inner periphery of each of the plurality of laminations and defining,
        a central coolant passage that extends along a rotational axis of the shaft, and
        a transverse coolant passage that extends from the central coolant passage such that coolant expelled from the central passage through the transverse coolant passage is received by the coolant aperture.

11. An electric machine comprising:
    a rotor comprising a plurality of laminations each defining an outer periphery, a plurality of magnet cavities, an inner periphery adapted to engage a rotating shaft, and a medial area extending therebetween that includes a coolant aperture having an inner edge and a plurality of elongated fins extending therefrom configured to transfer heat from the outer periphery to coolant flowing through the coolant aperture.

12. The electric machine of claim 11 wherein the coolant aperture has a triangular shape that includes a base and a vertex that includes a pair of sides extending from the base.

13. The electric machine of claim 12 wherein the each of the plurality of elongated fins extends from the inner edge of each of the sides.

14. The electric machine of claim 13 wherein each of the plurality of elongated fins extends from each of the sides in a direction that is normal to the inner edge of each of the sides.

15. The electric machine of claim 14 wherein each of the plurality of elongated fins defines a width and a length that is at least two times greater than the width.

\* \* \* \* \*